United States Patent
Stübbe et al.

(10) Patent No.: US 7,803,871 B2
(45) Date of Patent: Sep. 28, 2010

(54) AQUEOUS DISPERSION OF INORGANIC NANOPARTICLES, METHOD FOR THE PRODUCTION AND USE THEREOF

(75) Inventors: Winfried Stübbe, Greven (DE); Andreas Poppe, Münster (DE)

(73) Assignee: BASF Coatings GmbH, Muenster (DE)

( * ) Notice: Subject to any disclaimer, the term of this patent is extended or adjusted under 35 U.S.C. 154(b) by 310 days.

(21) Appl. No.: 10/510,993

(22) PCT Filed: May 2, 2003

(86) PCT No.: PCT/EP03/04645

§ 371 (c)(1),
(2), (4) Date: Oct. 12, 2004

(87) PCT Pub. No.: WO03/095571

PCT Pub. Date: Nov. 20, 2003

(65) Prior Publication Data

US 2005/0182169 A1  Aug. 18, 2005

(30) Foreign Application Priority Data

May 11, 2002  (DE) .................. 102 21 007

(51) Int. Cl.
*C09D 133/00* (2006.01)
*C09D 133/04* (2006.01)
*C09D 125/02* (2006.01)

(52) U.S. Cl. .................. 525/50; 525/55; 524/401; 524/442

(58) Field of Classification Search .............. 524/401, 524/442; 525/50, 55
See application file for complete search history.

(56) References Cited

U.S. PATENT DOCUMENTS

| | | | |
|---|---|---|---|
| 3,069,375 A | 12/1962 | Bullitt et al. | |
| 5,246,624 A | 9/1993 | Miller et al. | |
| 5,853,809 A | 12/1998 | Campbell et al. | |
| 6,261,645 B1 | 7/2001 | Betz et al. | |
| 6,419,989 B1 | 7/2002 | Betz et al. | |
| 6,599,631 B2 * | 7/2003 | Kambe et al. | ........... 428/447 |
| 6,620,514 B1 | 9/2003 | Arpac et al. | |
| 6,632,897 B1 | 10/2003 | Geiter et al. | |
| 2003/0125460 A1 | 7/2003 | Kato et al. | |
| 2004/0059053 A1 | 3/2004 | Bremser et al. | |
| 2004/0132902 A1 | 7/2004 | Bremser et al. | |

FOREIGN PATENT DOCUMENTS

| | | |
|---|---|---|
| DE | 3828098 | 3/1990 |
| DE | 3836815 | 7/1990 |
| DE | 19910876 | 10/2000 |
| DE | 19930664 | 1/2001 |
| EP | 365027 | 4/1990 |
| EP | 450625 | 10/1991 |
| WO | WO9712945 | 4/1997 |
| WO | WO9716479 | 5/1997 |
| WO | WO9952964 | 10/1999 |
| WO | WO0153107 | 7/2001 |
| WO | WO02055186 | 7/2002 |
| WO | WO03016411 | 2/2003 |
| WO | WO03/095567 | 11/2003 |
| WO | WO03095532 | 11/2003 |

OTHER PUBLICATIONS

Abstract for DE19910876 from EPO, Oct. 5, 2000.
Abstract for DE3828098 from EPO, Mar. 8, 1990.
Abstract for EP450625 from EPO, Oct. 9, 1991.
Abstract for DE3836815 from EPO, Jul. 26, 1990.
Abstract for EP365027 from EPO, Apr. 25, 1990.

\* cited by examiner

*Primary Examiner*—Kelechi C Egwim
(74) *Attorney, Agent, or Firm*—Harness, Dickey & Pierce, P.L.C.

(57) ABSTRACT

An aqueous dispersion with a pH of from 2 to 7, comprising
(A) at least one swellable polymer or oligomer containing anionic and/or potentially anionic functional groups,
(B) surface-modified, cationically stabilized, inorganic nanoparticles of at least one kind,
(C) at least one compound selected from the group consisting of amphiphiles and organic compounds which are capable of forming chelate ligands, and
(D) at least one crosslinking agent;
method for its production and its use for producing highly scratch-resistant coatings, moldings, and self-supporting films.

23 Claims, No Drawings

AQUEOUS DISPERSION OF INORGANIC NANOPARTICLES, METHOD FOR THE PRODUCTION AND USE THEREOF

CROSS REFERENCE TO RELATED APPLICATIONS

This application is a National Phase Application of Patent Application PCT/EP03/04645 filed 2 May 2003, which claims priority to DE 102 21 007.1, filed on 11 May 2002.

FIELD OF THE INVENTION

The present invention relates to a novel aqueous dispersion of inorganic nanoparticles. The present invention also relates to a novel process for preparing aqueous dispersions of inorganic nanoparticles. The present invention further relates to the use of the novel aqueous dispersion of inorganic nanoparticles for producing coatings and paint systems and also moldings, especially optical moldings, and self-supporting films.

STATE OF THE ART

Aqueous dispersions of inorganic nanoparticles with their surface modified with at least one compound of the general formula I:

$$[(S\text{-})_o\text{-L-}]_m M(R)_n (H)_p \qquad (I)$$

in which the indices and variables have the following meanings:
S is a reactive functional group;
L is an at least divalent organic linking group;
H is a hydrolyzable monovalent group or a hydrolyzable atom;
M is a divalent to hexavalent main group or transition group metal;
R is a monovalent organic radical;
o is an integer from 1 to 5;
m+n+p is an integer from 2 to 6;
p is an integer from 1 to 6, and
m and n are zero or an integer from 1 to 5 are known from international patent application WO 99/52964. They are prepared by coating inorganic nanoparticles with the compounds I in aqueous dispersion, and then distillatively removing the alcohols formed by the hydrolysis and condensation.

The known aqueous dispersions of surface-modified inorganic nanoparticles may be used as coating materials for producing transparent, scratch-resistant coatings.

These known coatings are of high transparency and good adhesion to a large number of substrates. However, they are comparatively brittle and cannot be produced in coat thicknesses >30 μm, since stress cracks then occur. Moreover, the known coatings undergo delamination comparatively readily following exposure to water.

European patent application EP 0 832 947 A2 discloses clearcoat materials comprising inorganic nanoparticles whose surface has been modified such that it is able to react with the binder. The scratch resistance of the clearcoats produced from these clearcoat materials does not, however, match that of the coatings known from international patent application WO 99/52964. Moreover, the clearcoat materials of the European patent application include large amounts of organic solvents, and so give off large amounts of volatile organic compounds (VOCs) on application and curing, which is economically and environmentally disadvantageous.

As is known, amino resins can be used as crosslinking agents or as additional binders for organic-inorganic coating materials based on hydroxy-functional polysiloxanes (cf. the article by B. C. Li and G. Wilkes in Chemical Materials, No. 13, pages 3663 to 3668, 2001). The coatings produced therefrom, however, are brittle, so that coat thicknesses of only 3 to 5 μm can be realized.

German patent application DE 101 26 651.0, unpublished at the priority date of the present specification, describes coating materials which comprise
(A) at least one binder selected from the group consisting of random, alternating, and block, linear, branched, and comb, polyaddition resins, polycondensation resins, and addition (co)polymers of olefinically unsaturated monomers, curable physically, thermally, with actinic radiation, and both thermally and with actinic radiation; and
(B) nanoparticles selected from the group consisting of nanoparticles that have been modified with at least one compound of the general formula (II):

$$[(S\text{-})_o\text{-L-}]_n\text{-M-}(\text{-X}\text{—}R)_{m-n} \qquad (II)$$

in which the indices and variables have the following meanings:
S is a reactive functional group containing at least one bond which can be activated with actinic radiation;
L is an at least divalent organic linking group;
X independently at each occurrence is an oxygen atom, sulfur atom or >NR$^1$, where R$^1$=hydrogen atom or alkyl group having from 1 to 4 carbon atoms;
M is a metal atom;
R is a monovalent organic radical;
o is an integer from 1 to 5;
m is 3 or 4;
n is 1 or 2 if m=3 and
n is 1, 2 or 3 if m=4.

The coating materials may comprise (meth)acrylate copolymers as binders. Besides numerous other monomers, the (meth)acrylate copolymers may also contain monomers (b) of the general formula III:

$$R^1 R^2 C\!=\!CR^3 R^4 \qquad (III)$$

in which the radicals R$^1$, R$^2$, R$^3$, and R$^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables R$^1$, R$^2$, R$^3$, and R$^4$ are substituted or unsubstituted aryl, arylalkyl or arylcycloalkyl radicals, especially substituted or unsubstituted aryl radicals.

The coating materials may be conventional systems comprising organic solvents, aqueous systems, substantially or entirely solvent- and water-free liquid coating materials (100% systems), substantially or entirely solvent- and water-free solid coating materials (powder coating materials), or substantially or entirely solvent-free powder coating suspensions (powder slurries). The examples, however, describe only a conventional clearcoat material comprising organic solvents. Moreover, the electrophoretic mobility of the binders in an aqueous dispersion with a pH of from 2 to 7 is not specified.

German patent application DE 101 15 592.1, unpublished at the priority date of the present specification, describes aqueous dispersions which are free or substantially free from volatile organic compounds and comprise (A) at least one copolymer preparable by two-stage or multistage free-radical copolymerization in an aqueous medium of
  a) at least one olefinically unsaturated monomer selected from the group consisting of hydrophilic and hydrophobic olefinically unsaturated monomers and
  b) at least one non-(a) olefinically unsaturated monomer of the general formula (III)

$$R^1R^2C\!=\!CR^3R^4 \qquad (III)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals;

and
(B) hydrophilic nanoparticles.

The surface of the hydrophilic nanoparticles, however, is unmodified.

PROBLEM OF THE PRESENT INVENTION

It is an object of the present invention to provide novel aqueous dispersions of surface-modified inorganic nanoparticles which no longer have the disadvantages of the state of the art but instead give coatings and paint systems, and also optical moldings and self-supporting films, which are highly scratch resistant, of high gloss, flexible, transparent, and clear, the coatings and the paint systems no longer exhibiting any stress cracks at coat thicknesses >30 μm or any delamination from the substrates. Moreover, the coatings and paint systems should exhibit high chemical stability.

A particular object of the present invention was to provide novel aqueous dispersions which have a high nanoparticle content and very good pigment wetting, so that they also produce highly scratch resistant solid-color and/or effect topcoat systems, moldings and self-supporting films which are free from stress cracks and delamination.

THE SOLUTION ACCORDING TO THE INVENTION

The invention accordingly provides the novel aqueous dispersion with a pH of from 2 to 7, comprising
(A) at least one swellable polymer or oligomer containing anionic and/or potentially anionic and/or nonionic hydrophilic groups,
(B) surface-modified, cationically stabilized, inorganic nanoparticles of at least one kind,
(C) at least one amphiphile, and
(D) at least one crosslinkinq agent, and referred to below as "dispersion of the invention".

Further subject matter of the invention will emerge from the description.

In the light of the state of the art it was surprising and unforeseeable for the skilled worker that the object on which the present invention was based could be achieved by means of the dispersion of the invention.

Since a positive surface charge is essential for a series of aqueous dispersions of inorganic nanoparticles (examples being boehmite and certain silica sols), it was all the more suprising that a combination of cationically stabilized, surface-modified, inorganic nanoparticles with anionically stabilized polymers and oligomers led to storage-stable aqueous dispersions. More surprising still was that this was achievable by means of copolymers which were readily swellable in aqueous media with a pH of from 2 to 7 and which therefore exhibited good electrophoretic mobility. A particular surprise was that the dispersions of the invention had a particularly high nanoparticle content.

A particular surprise, however, was that the dispersions of the invention gave pigmented and unpigmented coatings and paint systems which even at thicknesses of >30 μm were free from stress cracks and delamination and were stable to chemicals and of high scratch resistance. Moreover, the moldings and films produced from the dispersions of the invention were highly scratch resistant, chemically stable, and free from stress cracks.

DETAILED DESCRIPTION OF THE INVENTION

The dispersion of the invention has a pH of from 2 to 7, preferably from 2.5 to 7 and in particular from 3 to 6.5. The pH is adjusted by adding organic and/or inorganic acids which do not undergo any unwanted reactions with the starting products and with the constituents of the dispersion for use in accordance with the invention, such as precipitation reactions or the decomposition of nanoparticles (B). Examples of suitable acids are formic, acetic, and hydrochloric acid.

The solids content of the dispersion for use in accordance with the invention may vary very widely and is guided by the requirements of the case in hand. It is preferably from 10 to 80%, more preferably from 15 to 75%, with particular preference from 20 to 70%, with very particular preference from 25 to 65%, and in particular from 30 to 60% by weight, based in each case on the total amount of the dispersion for use in accordance with the invention.

The first essential constituent of the dispersion for use in accordance with the invention is at least one, especially one, swellable polymer or oligomer (A), particularly a polymer (A), containing anionic and/or potentially anionic functional groups.

Here and below, polymers are compounds which contain on average more than 10 monomer units in the molecule. Oligomers are compounds which contain on average from 2 to 15 monomer units in the molecule. For further details of this, refer to Römpp Lexikon Lacke und Druckfarben, Georg Thieme Verlag, Stuttgart, New York, 1998, page 425, "oligomers", and page 464, "polymers".

The anionic and potentially anionic functional groups are preferably selected from the group consisting of carboxylic, sulfonic, and phosphonic acid groups, acidic sulfuric and phosphoric ester groups, and carboxylate, sulfonate, phosphonate, sulfate ester, and phosphate ester groups, especially carboxylic acid and carboxylate groups.

The amount of anionic and/or potentially anionic functional groups in the polymers and oligomers (A) may vary very widely and is guided by the requirements of the case in hand, particularly by the amount of these groups that is necessary in order to ensure the swellability of the polymers and oligomers (A) in aqueous media with a pH of from 2 to 7. The amount corresponds preferably to an acid number of from 5 to 70, more preferably from 6 to 60, with particular preference from 7 to 50, with very particular preference from 8 to 40, and in particular from 9 to 30 mg KOH/g.

At pH values of from 2 to 7 the swellable polymers and oligomers (A) preferably have an electrophoretic mobility $\leq\!-0.5$, more preferably $\leq\!-2.0$ (μm/s)/(V/cm). The electrophoretic mobility can be determined with the aid of laser Doppler electrophoresis. The Zetasizer® 3000 from Malvern can be employed as the measuring instrument. However, microelectrophoretic (microscopic) measurement techniques are also suitable.

The polymers and oligomers (A) are preferably selected from the group of copolymers obtainable by single-stage or two-stage or multistage controlled free-radical copolymerization in an aqueous or an organic medium, particularly in an aqueous medium, which copolymers are described in detail in the German patent application DE 199 30 664 A1, page 4, line 28 to page 9, line 49. These copolymers can also be produced by (co)polymerizing a copolymer, which has been formed as an intermediate, following the addition of small amounts of initiators for the polymerization or without such an addition, with at least one olefinically unsaturated monomer. It is possible to incorporate reactive functional groups into the copolymers (A) which are able to enter into thermal crosslinking reactions with the complementary reactive functional groups (S2), described below, in the compounds I described below. Moreover, it is possible to incorporate functional groups which give the copolymers (A) self-crosslinking properties, such as N-methylol or N-alkoxymethyl or N-methylol ether groups. Incorporated into the copolymers (A) not least may be at least one of the reactive functional groups (S1) described below, containing at least one bond which can be activated with actinic radiation, which are able to react with any bonds which can be activated with actinic radiation that are present in the compounds I described below. Of course, both kinds of reactive functional groups (S1) and (S2) may be incorporated into the copolymers (A). The copolymers (A) in question are in that case curable both thermally and with actinic radiation, something which is referred to by those in the art as dual cure.

Here and below, actinic radiation means electromagnetic radiation, such as near infrared (NIR), visible light, UV radiation or X-rays, especially UV radiation, and corpuscular radiation, such as electron beams.

The copolymer (A) may therefore contain at least one, preferably at least two, reactive functional groups (S2) which are able to enter into reactions, especially thermal crosslinking reactions with complementary reactive functional groups (S2). These reactive functional groups may be incorporated into the copolymers (A) by way of the monomers (a), or may be introduced by means of polymer-analogous reactions following the synthesis of said copolymers. It should be ensured here that the reactive functional groups (S2) do not undergo any unwanted reactions with one another or with the aqueous medium, such as, for example, unwanted salt formation, the formation of insoluble precipitates, or premature crosslinking, all of which would adversely affect the stability of the dispersion of the invention.

The constituents (B), (C) and (D) described below preferably comprise the complementary reactive functional groups (S2).

Examples of suitable complementary reactive functional groups (S2) that enter into crosslinking reactions are compiled in the overview below. In the overview, the variable $R^5$ stands for substituted or unsubstituted alkyl, cycloalkyl, alkylcycloalkyl, cycloalkylalkyl, aryl, alkylaryl, cycloalkylaryl, arylalkyl or arylcycloalkyl radicals.

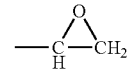

Suitable reactors for the (co)polymerization processes are the customary and known stirred tanks, stirred tank cascades, tube reactors, loop reactors or Taylor reactors, as described for example in the patents DE 198 28 742 A 1 and EP 0 498 583 A 1 or in the article by K. Kataoka in Chemical Engineering Science, Volume 50, No. 9, 1995, pages 1409 to 1416. The free-radical copolymerization is preferably conducted in stirred tanks or Taylor reactors, the Taylor reactors being designed so that the conditions of Taylor flow are met over the entire length of the reactor, even if there is a sharp change—especially an increase—in the kinematic viscosity of the reaction medium owing to copolymerization (cf. the German patent application DE 198 28 742 A 1).

The copolymerization is advantageously conducted at temperatures above room temperature and below the lowest decomposition temperature of the respective monomers used, preference being given to the choice of temperature range from 10 to 150° C., with very particular preference from 50 to 120° C., and in particular from 55 to 110° C.

When using particularly volatile monomers the copolymerization may also be conducted under pressure, preferably under from 1.5 to 3000 bar, more preferably from 5 to 1500 bar, and in particular from 10 to 1000 bar.

As far as the molecular weight distribution is concerned, the copolymer (A) is not subject to any restrictions whatsoever. Advantageously, however, the copolymerization is conducted so as to give a ratio Mw/Mn, measured by gel permeation chromatography using polystyrene as standard, of $\leq 4$, preferably $\leq 2$, and in particular $\leq 1.5$, and, in certain cases, even $\leq 1.3$ (c.f. in this regard the German patent application DE 199 30 664 A1).

The amount of the copolymer (A) in the dispersion for use in accordance with the invention may vary widely and is guided by the requirements of the case in hand. Preferably, the copolymer (A) is present in the dispersion for use in accordance with the invention in an amount, based on the sum of the essential constituents (A), (B), (C), and (D), of from 1 to 40, preferably 1 to 30 and in particular 1 to 20% by weight.

The further essential constituent of the dispersion for use in accordance with the invention comprises surface-modified, cationically stabilized, inorganic nanoparticles (B) of at least one kind, particularly of one kind.

The nanoparticles to be modified are preferably selected from the group consisting of main group and transition group metals and their compounds. The main group and transition group metals are preferably selected from metals of main groups three to five, transition groups three to six and also one and two of the periodic system of the elements, and the lanthanides. Particular preference is given to using boron, aluminum, gallium, silicon, germanium, tin, arsenic, antimony, silver, zinc, titanium, zirconium, hafnium, vanadium, niobium, tantalum, molybdenum, tungsten, and cerium, especially aluminum, silicon, silver, cerium, titanium, and zirconium.

The compounds of the metals are preferably the oxides, oxide hydrates, sulfates or phosphates.

Preference is given to using silver, silicon dioxide, aluminum oxide, aluminum oxide hydrate, titanium dioxide, zirconium oxide, cerium oxide, and mixtures thereof, with particular preference silver, cerium oxide, silicon dioxide, aluminum oxide hydrate, and mixtures thereof, with very particular preference aluminum oxide hydrate, and especially boehmite.

The nanoparticles to be modified preferably have a primary particle size <50 nm, more preferably from 5 to 50 nm, in particular from 10 to 30 nm.

The nanoparticles (B) for use in accordance with the invention, or their surface, are modified with at least one compound of the general formula I:

$$[(S-)_o-L-]_m M(R)_n (H)_p \qquad (I).$$

In the general formula I the indices and variables have the following meanings:
S is a reactive functional group;
L is an at least divalent organic linking group;
H is a hydrolyzable monovalent group or a hydrolyzable atom;
M is a divalent to hexavalent main group or transition group metal;
R is a monovalent organic radical;
o is an integer from 1 to 5, especially 1;
m+n+p is an integer from 2 to 6, especially 3 or 4;
p is an integer from 1 to 6, especially from 1 to 4;
m and n are zero or an integer from 1 to 5, preferably from 1 to 3, in particular 1, especially m=1 and n=0.

Said modification may be effected by physical adsorption of the compounds I onto the surface of the unmodified nanoparticles and/or by chemical reaction of the compounds I with suitable reactive functional groups on the surface of the unmodified nanoparticles. Preferably, the modification is effected by way of chemical reactions.

Examples of suitable metals M are those described above.

The reactive functional group S is preferably selected from the group consisting of (S1) reactive functional groups which contain at least one bond which can be activated with actinic radiation and (S2) reactive functional groups which undergo reactions with groups of their own kind ("with themselves") and/or with complementary reactive functional groups. Examples of suitable reactive functional groups (S2) are those described above, especially the epoxide groups.

In the context of the present invention a bond which can be activated with actinic radiation is a bond which on exposure to actinic radiation becomes reactive and, with other activated bonds of its kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity they are referred to below as "double bonds".

Accordingly, the inventively preferred reactive group (S1) contains one double bond or two, three or four double bonds. Where more than one double bond is used, the double bonds may be conjugate. In accordance with the invention, however, it is an advantage if the double bonds are isolated, in particular each terminally, within the group (S1) in question. It is of particular advantage in accordance with the invention to use two double bonds, especially one double bond.

The bonds which can be activated with actinic radiation may be connected to the linking group L by way of carbon-carbon bonds or ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone or sulfoxide groups, but in particular by way of carbon-carbon bonds, carboxylate groups, and ether groups.

Particularly preferred reactive functional groups (S1) are therefore (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially methacrylate groups (S1).

The variable H stands for a hydrolyzable monovalent group or for a hydrolyzable atom.

Examples of suitable hydrolyzable atoms are hydrogen atoms and halogen atoms, especially chlorine and bromine atoms.

Preferably, the hydrolyzable monovalent groups are used. Examples of suitable groups of this kind are groups of the general formula IV:

$$\text{—X—R} \qquad (IV).$$

In the general formula IV the variable X stands for an oxygen atom, sulfur atom and/or group >NR$^6$, in which R$^6$ denotes an alkyl group having from 1 to 4 carbon atoms, especially methyl, ethyl, propyl, and n-butyl. Preferably, X stands for an oxygen atom.

R stands for a monovalent organic radical. The monovalent radical R may be substituted or unsubstituted; preferably, it is unsubstituted. It may be aromatic, aliphatic or cycloaliphatic. A monovalent radical R is regarded as aromatic when X is connected directly to the aromatic radical. This rule is to be applied mutatis mutandis to the aliphatic and cycloaliphatic radicals. Preference is given to using linear or branched, especially linear, aliphatic radicals. Lower aliphatic radicals are preferred. Of these, the methyl groups or the ethyl groups are used with very particular preference.

The variable L stands for an at least divalent, especially divalent, organic linking group.

Examples of suitable divalent organic linking groups L are aliphatic, aromatic, cycloaliphatic, and aromatic-cycloaliphatic, and also heteroatoms-containing aliphatic, aromatic, cycloaliphatic, and aromatic-cycloaliphatic, hydrocarbon radicals, such as (1) substituted or unsubstituted, preferably unsubstituted, linear or branched, preferably linear, alkanediyl radicals having from 3 to 30, preferably from 3 to 20, and in particular 3 carbon atoms, which may also contain cyclic groups within the carbon chain, especially trimethylene, tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl preferably tetramethylene, pentamethylene, hexamethylene, heptamethylene, octamethylene, nonane-1,9-diyl, decane-1,10-diyl, 2-heptyl-1-pentylcyclohexane-3,4-bis(non-9-yl), cyclohexane-1,2-, -1,4- or -1,3-bis(methyl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl);

(2) substituted or unsubstituted, preferably unsubstituted, linear or branched, preferably linear, oxaalkanediyl radicals having from 3 to 30, preferably from 3 to 20, and in particular from 3 to 6 carbon atoms, which may also contain cyclic groups within the carbon chain, especially oxapropane-1,4-diyl, oxabutane-1,5-diyl, oxapentane-1,5-diyl, oxahexane-1,7-diyl or 2-oxapentane-1,5-diyl;

(3) divalent polyester radicals containing repeating polyester units of the formula —(—CO—(CHR$^7$)$_r$—CH$_2$—O—)—. In this formula the index r is preferably from 4 to 6 and the substituent R$^7$=hydrogen, or an alkyl, cycloalkyl or alkoxy radical. No substituent contains more than 12 carbon atoms;

(4) linear polyether radicals, preferably having a number-average molecular weight of from 400 to 5000, in particular from 400 to 3000, which derive from poly(oxyethylene) glycols, poly(oxypropylene) glycols, and poly(oxybutylene) glycols;

(5) linear siloxane radicals, as are present, for example, in silicone rubbers, hydrogenated polybutadiene radicals or polyisoprene radicals, random or alternating butadiene-isoprene copolymer radicals or butadiene-isoprene graft copolymer radicals, which may also contain copolymerized styrene, and also ethylene-propylene-diene radicals;

(6) phen-1,4-, -1,3- or -1,2-ylene, naphth-1,4-, -1,3-, -1,2-, -1,5- or -2,5-ylene, propane-2,2-di(phen-4'-yl), methanedi(phen-4'-yl), biphenyl-4,4'-diyl or 2,4- or 2,6-tolylene; or (7) cycloalkanediyl radicals having from 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl; 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4 '-diyl.

With particular preference, the linking groups L(1) and L(2) are used, with very particular preference trimethylene, tetramethylene, pentamethylene, hexamethylene, heptamethylene, octamethylene, oxapropane-1,4-diyl or 2-oxapentane-1,5-diyl, and especially trimethylene, oxapropane-1,4-diyl or 2-oxapentane-1,5-diyl.

In the general formula I the variable o stands for an integer from 1 to 5, preferably from 1 to 4, more preferably 1 to 3, and with particular preference 1 and 2. In particular, o is equal to 1.

The compounds I may also be used in complexed form, as is described, for example, in the international patent application WO 99/52964, page 8 lines 12 to 20.

The compounds I are customary and known and to a large extent are available commercially. Highly suitable compounds I are known, for example, from the
  international patent application WO 99/52964, page 6 line 1 to page 8 line 20,
  German patent application DE 197 26 829 A1, column 2 line 27 to column 3 line 38,
  German patent application DE 199 10 876 A1, page 2 line 35 to page 3 line 12,
  German patent application DE 38 28 098 A1, page 2 line 27 to page 4 line 43, or
  European patent application EP 0 450 625 A1, page 2 line 57 to page 5 line 32.

Viewed in terms of its method, the modification of the surface of the nanoparticles has no special features but instead takes place in accordance with the customary and known methods known, for example, from international patent application WO 99/52964, page 10 line 22 to page 11 line 17 and examples 1 to 20, page 14 line 10 to page 20 line 24, or from German patent application DE 197 26 829 A1, examples 1 to 6, column 5 line 63 to column 8 line 38. It is preferred to employ the proportions stated therein of compounds I to unmodified nanoparticles.

The amount of the surface-modified inorganic nanoparticles (B) in the dispersion for use in accordance with the invention may vary widely and is guided by the requirements of the case in hand. In the dispersion for use in accordance with the invention the nanoparticles (B) are present preferably in an amount, based on the sum of the essential constituents (A), (B), (C), and (D), of from 30 to 95, preferably 40 to 90 and in particular from 40 to 85% by weight.

The further essential constituent of the dispersion of the invention is at least one amphiphile (C).

Amphiphiles (C), as is known, are molecules having both hydrophilic and lipophilic properties (cf. Römpp Chemie Lexikon, Georg Thieme Verlag, Stuttgart, New York, 9th Edition, 1989, Volume 1, page 176, "amphiphile").

The amphiphiles (C) are preferably selected from the group consisting of monoalcohols, especially monoalcohols having from 3 to 6 carbon atoms in the molecule, and aliphatic polyols, especially diols having from 3 to 12 carbon atoms in the molecule.

Examples of highly suitable monoalcohols are propanol, isopropanol, n-butanol, isobutanol, sec-butanol, tert-butanol, amyl alcohol, neopentyl alcohol or n-hexanol.

Examples of suitable diols are propylene glycol, trimethylene glycol, butylene glycol, 1,5-pentanediol, 1,6-hexanediol, and the positionally isomeric diethyloctanediols, such as are known, for example, from the German patent application DE 198 09 643 A1.

Particular preference is given to using propanol, isopropanol, butanol or isobutanol.

In addition to the amphiphiles (C) or instead of them it is possible to use at least one organic, preferably nonaromatic, compound which is able to form chelate ligands. These are organic compounds containing at least two functional groups which are able to coordinate with metal atoms or metal ions. These functional groups are normally electron donors, which give up electrons to metal atoms or metal ions as electron acceptors. Examples of suitable organic compounds are dimethyl glyoxime, ethylenediaminetetraacetic acid or -phosphonic acid, ether amines or acetic acid or compounds containing carbonyl groups in 1,3 position, such as acetylacetone or ethyl acetoacetate. For further details, refer to Römpp Chemie Lexikon, Georg Thieme Verlag, Stuttgart, 1989, Volume 1, page 634. With particular preference ethyl acetoacetate is used.

The amount of the amphiphiles (C) and/or the chelate-forming compounds in the dispersion of the invention may vary very widely and is guided by the requirements of the case in hand. Preferably, the amphiphiles (C) and/or the chelate-forming compounds (C) are present in the dispersion for use in accordance with the invention in an amount, based on the sum of the essential constituents (A), (B), (C) and (D), of from 1 to 30%, more preferably from 1 to 25%, and in particular from 1 to 20% by weight.

The dispersion of the invention further comprises at least one, preferably at least two, and especially two, crosslinking agents (D). It is possible to use the crosslinking agents (D) such as are normally used in the field of thermally curable coating materials. The crosslinking agents (D) contain reactive functional groups (S2) which are able to undergo reactions with themselves and/or with complementary reactive functional groups (S2). These complementary reactive functional groups (S2) are preferably present in the polymer and/or oligomer (A), on the surface-modified nanoparticles (B) and/or in the amphiphile (C). Examples of suitable reactive functional groups (S2) can be seen from the overview "Examples of complementary reactive functional groups (S2)". The reactive functional groups (S2) are preferably selected from the group consisting of N-methylol, N-methylol ether, and alkoxycarbonylamino groups.

Examples of suitable crosslinking agents (D) which contain these preferred reactive functional groups (S2) are amino resins and tris(alkoxycarbonylamino)triazines.

The suitable tris(alkoxycarbonylamino)triazines have the following general formula:

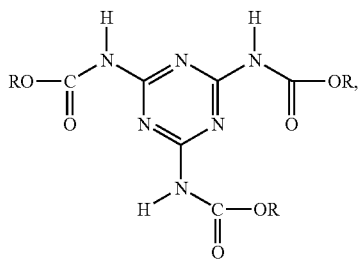

in which R stands in particular for alkyl groups. They are described, for example, in the American patents U.S. Pat. No. 4,939,213 A1, U.S. Pat. No. 5,084,541 A1 or in the European patent application EP 0 624 577 A1. Use is made in particular of tris(methoxycarbonylamino), tris(butoxy-carbonylamino) and/or tris(2-ethylhexoxycarbonylamino)triazine. Of advantage are the methyl butyl mixed esters, the butyl 2-ethylhexyl mixed esters, and the butyl esters. They have the advantage over the straight methyl ester of better solubility in polymer melts and also tend less toward crystallizing out.

Examples of suitable amino resins are melamine resins, guanamine resins or urea resins, especially melamine-formaldehyde resins. They are described, for example, in Römpp Lexikon Lacke und Druckfarben, Georg Thieme Verlag, 1998, page 29, "Amino resins" in the text book "Lackadditive" by Johan Bieleman, Wiley-VCH, Weinheim, N.Y., 1998, pages 242 ff., in the book "Paints, Coatings and Solvents" second, completely revised edition, edited by D. Stoye and W. Freitag, Wiley-VCH, Weinheim, N.Y., 1998, pages 80 ff., in the patents U.S. Pat. No. 4,710,542 A1 and EP 0 245 700 B1, in the article by B. Singh and coworkers, "Carbamylmethylated Melamines, Novel Crosslinkers for the Coatings Industry" in Advanced Organic Coatings Science and Technology Series, 1991, Volume 13, pages 193 to 207, or in the article by B. C. Li and G. Wilkes in Chemical Materials, No. 13, pages 3663 to 3668, 2001.

The amount of the crosslinking agent or agents (D) in the dispersion of the invention may vary very widely and is guided in particular by the functionality of the other constituents (A), (B) and/or (C) in terms of the complementary reactive functional groups (S2). The amount is preferably from 1 to 50%, more preferably from 1 to 40%, and in particular from 1 to 30% by weight, based in each case on the sum of the essential constituents (A), (B), (C) and (D).

The dispersion of the invention may further comprise at least one customary and known pigment (E). The amount of the pigments (E) in the dispersion of the invention may vary very widely and is guided in particular by the dispersibility of the pigments and by the technical effect that is to be achieved therewith. The skilled worker is able to determine this amount in the case in hand on the basis of his or her general art knowledge, with ease. The pigment (E) is preferably selected from the group consisting of color pigments, optical effect pigments, electrically conductive pigments, magnetic pigments, magnetically shielding pigments, fluorescent pigments, phosphorescent pigments, corrosion inhibitor pigments, and extender pigments, and also pigments having at least two of these properties. The pigments (E) are incorporated into the dispersions of the invention preferably by way of pigment pastes, especially pastes based on dispersions of copolymers (A).

Besides the constituents described above, the dispersion of the invention may further comprise other constituents customary in coating materials such as usual and known additives.

The preparation of the dispersion of the invention requires no special features in terms of method but instead takes place in accordance with the customary and known methods of preparing aqueous dispersions, by mixing of the above-described constituents in suitable mixing equipment such as stirred tanks, dissolvers, Ultraturrax, inline dissolvers, mills with stirrer mechanism, bead mills or extruders.

The dispersion of the invention serves for producing the films, moldings, in particular optical moldings and coatings of the invention in particular coatings on primed or unprimed substrates. It is further suitable for all end uses which are described in international patent application WO 99/52964, page 12 line 10 to page 14 line 4, especially for producing optical moldings and self-supporting films.

Suitable substrates include all surfaces to be coated which are undamaged by curing of the coatings present thereon using heat or both heat and actinic radiation. Suitable substrates are composed, for example, of metals, plastics, wood, ceramic, stone, textile, fiber composites, leather, glass, glass fibers, glass wool, rock wool, mineral-bound and resin-bound building materials, such as plasterboard and cement slabs or roof shingles, and also composites of these materials. The surfaces of these materials may already be coated.

Accordingly, the dispersion of the invention is especially suitable for coating motor vehicle bodies and parts thereof, the interior and exterior of motor vehicles, the interior and exterior of buildings, doors, windows, and furniture, and, in industrial coating, for the coating of plastics parts, especially transparent plastics parts, small parts, coils, containers, packaging, electrical components, and white goods, and also for the coating of hollow glassware.

In the case of electrically conductive substrates it is possible to use primers, produced conventionally from electrocoat materials. Both anodic and cathodic electrocoat materials may be used for this purpose, but especially cathodics.

With the coating of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR- RIM, SMC, BMC, PP-EPDM, and UP (abbreviations according to DIN 7728T1) and also polymer blends thereof or the fiber-reinforced composite materials produced using these plastics.

Unfunctionalized and/or apolar substrate surfaces may be subjected prior to coating in a known manner to a pretreatment, such as with a plasma or by flaming, or may be provided with a hydroprimer.

Particular advantages are displayed by the dispersion of the invention and the coatings of the invention in automotive OEM finishing and refinish as clear and transparent, highly scratch-resistant, high-gloss, flexible, acid- and water-resistant, firmly adhering, antistonechip clearcoats as part of multicoat color and/or effect paint systems.

The multicoat paint systems of the invention may be produced in a variety of ways in accordance with the invention. Preference is given to the use of the wet-on-wet method described in the German patent application DE 199 30 664 A1, page 15, lines 36 to 58.

It is a further particular advantage of the dispersion of the invention that it is also outstandingly suitable for producing color and/or effect coatings, especially solid-color topcoat systems. The solid-color topcoat systems of the invention are extremely scratch resistant, flexible, chemical resistant, stable to weathering, of high gloss and outstanding hiding power, and adhere excellently to the primed and unprimed substrates. They are therefore especially suitable for the OEM finishing and refinish of automobiles.

Since the coatings of the invention produced from the dispersion of the invention adhere so excellently even to already cured electrocoats, surfacer coats, base coats or customary and known clearcoats, they are outstandingly suitable for automotive refinish or for the scratchproofing of exposed areas on painted automobile bodies.

The dispersion of the invention may be applied by any customary method, such as spraying, knife coating, brushing, flowcoating, dipping, impregnating, trickling or rolling, for example. The substrate to be coated may itself be at rest, with the application equipment or unit being moved. Alternatively the substrate to be coated, especially a coil, may be moving, with the application unit being at rest relative to the substrate or being moved appropriately.

Preference is given to using spray application methods, such as compressed air spraying, airless spraying, high-speed rotation, electrostatic spray application (ESTA), alone or in conjunction with hot spray applications such as hot air spraying, for example. Application can be made at temperatures of max. 70 to 80° C., so that appropriate application viscosities are achieved without the short period of thermal loading being accompanied by any change in or damage to the water-based paint system, or its overspray, which may be intended for reprocessing. For instance, hot spraying may be configured in such a way that the dispersion of the invention is heated only very briefly in the spray nozzle or shortly before the spray nozzle.

The spray booth used for application may be operated, for example, with a circulation system, which may be temperature-controllable, and which is itself operated with a suitable absorption medium for the overspray, an example being the dispersion of the invention itself.

It is of very particular advantage that the coating of the invention can be applied by applying the dispersion of the invention in one step, and does not have to be built up from a plurality of discrete coatings which have been produced separately.

In the case of the automotive paint system the electrocoat film, surfacer film, basecoat film, clearcoat film, and solid-color topcoat film are usually applied in a wet film thickness such that curing thereof gives coats having the thicknesses which are advantageous and necessary for their functions. In the case of the electrocoat this thickness is from 10 to 70 µm, preferably from 10 to 60 µm, with particular preference from 15 to 50 µm, and in particular from 15 to 45 µm; in the case of the surfacer coat it is from 10 to 150 µm, preferably from 10 to 120 µm, with particular preference from 10 to 100 µm, and in particular from 10 to 90 µm; in the case of the basecoat it is from 5 to 50 µm, preferably from 5 to 40 µm, with particular preference from 5 to 30 µm, and in particular from 10 to 25 µm; in the case of the clearcoats of the invention it is at least from 30 to 120 µm, preferably at least from 40 to 100 µm, with particular preference from 50 to 100 µm, and in particular from 60 to 100 µm and in the case of the solid-color topcoats it is from 15 to 100 µm, preferably from 20 to 90 µm, with particular preference from 20 to 85 µm and in particular from 20 to 80 µm. It is, however, also possible to employ the multicoat system known from European patent application EP 0 817 614 A1, comprising an electrocoat, a first basecoat, a second basecoat, and a clearcoat of the invention, in which the total thickness of the first and second basecoat is from 15 to 40 µm and the coat thickness of the first basecoat amounts to from 20 to 50% of said total thickness.

The surfacer film and solid-color topcoat film or the surfacer film, basecoat film, and clearcoat film may be cured thermally or both thermally and with actinic radiation (dual cure).

Curing may take place after a certain rest period. This period may have a duration of from 30 s to 2 h, preferably from 1 min to 1 h, and in particular from 1 min to 45 min. The rest period serves, for example, for leveling and for devolatilization of the paint films or for the evaporation of volatile constituents such as solvents. The rest period may be shorted and/or assisted by the application of elevated temperatures up to 90° C. and/or by a reduced humidity <10 g water/kg air, especially <5 g/kg air, provided this is not accompanied by any change in or damage to the coating films, such as premature complete crosslinking, for instance.

The thermal curing has no special features in terms of method but instead takes place in accordance with the customary and known methods, such as heating in a convection oven or irradiation with IR lamps. Thermal curing here may also take place in stages. Another preferred method of curing is that using near infrared (NIR radiation). Particular preference is given to a process in which the water component is removed rapidly from the wet films. Suitable processes of this kind are described, for example, by Rodger Talbert in Industrial Paint & Powder, 04/01, pages 30 to 33, "Curing in Seconds with NIR", or in Galvanotechnik, volume 90 (11), pages 3098 to 3100, "coating technology, NIR drying in seconds for liquid and powder coatings".

The thermal curing takes place advantageously at a temperature of from 50 to 200° C., with particular preference from 60 to 190° C., and in particular from 80 to 180° C. for a time of from 1 min up to 2 h, with particular preference from 2 min up to 1 h, and in particular from 3 min to 45 min.

Additionally, curing with actinic radiation is carried out using UV radiation and/or electron beams. In this case it is preferred to employ a dose of from 1000 to 3000, more preferably from 1100 to 2900, with particular preference from 1200 to 2800, with very particular preference from 1300 to 2700, and in particular from 1400 to 2600 mJ/cm$^2$. Where appropriate, this curing may be supplemented by actinic radiation from other radiation sources. In the case of electron beams it is preferred to operate under an inert gas atmosphere. This may be ensured, for example, by supplying carbon dioxide and/or nitrogen directly to the surface of the coating films. In the case of curing with UV radiation as well it is possible to operate under inert gas or in an oxygen-depleted atmosphere in order to prevent the formation of ozone.

Curing with actinic radiation is carried out using the customary and known radiation sources and optical auxiliary measures. Examples of suitable radiation sources are flash lamps from the company VISIT, high or low pressure mercury vapor lamps, which may be doped with lead in order to open up a radiation window up to 405 nm, or electron beam sources. The equipment and conditions for these curing methods are described, for example, in R. Holmes, U.V. and E.B. Curing Formulations for Printing Inks, Coatings and Paints, SITA Technology, Academic Press, London, United Kingdom, 1984. Further examples of suitable processes and equipment for curing with actinic radiation are described in German patent application DE 198 18 735 A1, column 10 lines 31 to 61.

In the case of workpieces of complex shape, such as are envisaged for automobile bodies, those regions not accessible to direct radiation (shadow regions), such as cavities, folds, and other structural undercuts, may be (partly) cured using pointwise, small-area or all-round emitters, in conjunction with an automatic movement means for the irradiation of cavities or edges.

Curing here may take place in stages, i.e., by multiple exposure to light or to actinic radiation. It may also be carried out alternatingly, i.e., by curing alternately with UV radiation and electron beams.

Where thermal curing and curing with actinic radiation are employed together, these methods may be used simultaneously or alternatingly. Where the two curing methods are used alternatingly, it is possible, for example, to begin with the thermal cure and to end with the actinic radiation cure. In other cases it may prove advantageous to begin and to end with the actinic radiation cure.

The multicoat paint systems of the invention have an outstanding profile of properties which is very well balanced in terms of mechanics, optics, corrosion resistance, and adhesion. Accordingly, the multicoat paint systems of the invention have the high optical quality and intercoat adhesion required by the market and do not give rise to any problems such as deficient condensation resistance, mudcracking or leveling defects or surface textures in the clearcoats of the invention.

In particular, the multicoat paint systems of the invention exhibit an outstanding metallic effect, an outstanding D.O.I. (distinctiveness of the reflected image), an especially high scratch resistance, and outstanding surface smoothness.

In particular, the solid-color topcoat systems of the invention exhibit brilliant colors, an outstanding surface smoothness, an especially high scratch resistance and chemical resistance, and a high gloss.

Accordingly, the primed or unprimed substrates of the invention that have been coated with at least one coating of the invention combine a particularly advantageous profile of performance properties with a particularly long service life, which makes them particularly valuable economically, esthetically, and technically.

EXAMPLES

Preparation Example 1

Preparing Dispersions of a Copolymer (A)

1361.7 parts by weight of deionized water were charged to a reaction vessel equipped with a stirrer and three feed vessels and were heated to 75° C. Subsequently, at this temperature, three separate feed streams were metered into this initial charge in parallel and at a uniform rate. Feed stream 1 consisted of 24.4 parts by weight of acrylic acid, 44.0 parts by weight of methyl methacrylate and 3.6 parts by weight of 1,1-diphenylethylene. Feed stream 2 consisted of 23 parts by weight of a 25% strength by weight aqueous ammonia solution. Feed stream 3 consisted of a solution of 5.4 parts by weight of ammonium peroxodisulfate in 138.7 parts by weight of deionized water. Feed streams 1 to 3 were metered in over 30 minutes. After the end of the addition the reaction mixture was stirred at 75° C. for one hour. It was subsequently heated to 90° C. At this temperature, via a feed stream 4, a monomer mixture of 191.7 parts by weight of n-butyl methacrylate, 153.4 parts by weight of styrene, 93.3 parts by weight of hydroxypropyl methacrylate, 424.9 parts by weight of hydroxyethyl methacrylate, 173.1 parts by weight of ethylhexyl methacrylate and 207.3 parts by weight of a 50% solution of tris(alkoxycarbonylamino)triazine (TACT) in butanol was metered in at a uniform rate over 4 h. After the end of the addition, there followed a two-hour postpolymerization period at 90° C. The resultant dispersion of the invention (A.1) had a solids content of 41.2% by weight.

At pH values from 2 to 7 the copolymer ((A.1) had an electrophoretic mobility $<-2$ $(\mu m/s)/(V/cm)$. The electrophoretic mobility was determined by means of laser Doppler electrophoresis. The measuring equipment employed was a Zetasizer® 3000 from Malvern.

Preparation Example 2

The Preparation of Surface-Modified Nanoparticles (B)

10 parts by weight of boehmite (Disperal® P 3 from Sasol Germany GmbH) were added to 90 parts by weight of dilute acetic acid (0.1 N) and the mixture was stirred at room temperature until the boehmite had fully dissolved. The colloidal solution was then treated for 5 minutes in an ultrasound bath. The result was a homogeneous boehmite sol.

33 parts by weight of glycidyloxypropyltriethoxysilane were added to the boehmite sol and the resultant mixture was then stirred for 2 h at room temperature.

Example 1

The Preparation of a Clearcoat Material and of a Multicoat Paint System

A clearcoat material was prepared by mixing the following constituents and homogenizing the resulting mixture:
133 parts by weight of the dispersion of surface-modified nanoparticles (B) from preparation example 2,
10 parts by weight of ethyl acetoacetate (C),
20 parts by weight of the dispersion of a copolymer (A) from preparation example 1,
20 parts by weight of a melamine-formaldehyde resin (CYMEL® 327, hexamethoxymethyl type, Dyno-Cytec), and
0.5 part by weight of BYK® 301 (silicone additive from Byk Chemie).

The clearcoat material was applied pneumatically to test panels in a number of cross passes using a gravity-feed cup gun in a wet film thickness such that after curing of the clearcoat films at 140° C. for 22 minutes the resulting clearcoats had a film thickness of 40 μm.

The test panels used were steel bodywork panels pretreated with commercial zinc phosphate solution. The steel panels were coated in succession with an electrocoat in a thickness of from 18 to 22 μm (cured at 175° C. for 15 minutes), a conventional surfacer with a thickness of from 35 to 40 µm (cured at 160° C. for 20 minutes), and a black basecoat with a thickness of from 12 to 15 µm (cured at 140° C. for 20 minutes).

The resultant clearcoats were free from stress cracks and other surface defects.

They were also exceptionally scratch resistant, which was proven in the steel wool scratch test.

The steel wool scratch test was carried out using a hammer to DIN 1041 (weight without shaft: 800 g; shaft length: 35 cm). The test panels were stored at room temperature for 24 h prior to the test.

The flat side of the hammer was wrapped with a ply of steel wool and fastened to the upturned sides using adhesive tape with a creped backing (Tesakrepp). The hammer was placed onto the clearcoats at right angles. The weighted part of the hammer was guided over the surface of the clearcoats in a track without tipping and without additional physical force.

For each test, 100 double strokes were performed within a period of about 100 s. After each of these individual tests, the steel wool was replaced.

Following exposure, the test panels were cleaned with a soft cloth to remove residues of steel wool. The test areas were evaluated visually under artificial light and rated as follows:

| Rating | Damage |
| --- | --- |
| 1 | none |
| 2 | slight |
| 3 | moderate |
| 4 | moderate to middling |
| 5 | severe |
| 6 | very severe |

Evaluation was carried out immediately after the end of the test.

The clearcoats were also chemically resistant, which was determined by means of the BART.

The BART (BASF ACID RESISTANCE TEST) was used to determine the resistance of paint surfaces to acids, alkalis, and water drops. After baking, the multicoat paint systems were subjected in a gradient oven to further temperature loads (30 min at 40° C., 50° C., 60° C. and 70° C.). Beforehand the test substances (1%, 10%, and 36% sulfuric acid; 5% sulfurous acid, 10% hydrochloric acid, 5% sodium hydroxide solution, DI (=deionized) water—1,2,3 or 4 drops) were applied in a defined manner using a volumetric pipette. Following exposure to the substances, they were removed under running water and the damage was assessed visually after 24 h in accordance with a given scale:

| Rating | Appearance |
| --- | --- |
| 0 | no defect |
| 1 | slight marking |
| 2 | marking/matting/no softening |
| 3 | marking/matting/color change/softening |
| 4 | cracks/incipient etching |
| 5 | clearcoat removed |

Each individual mark (spot) was evaluated and the result was set down in a ratings total for each test substance:

| Test substance | Rating |
| --- | --- |
| Sulfuric acid, 1% | 1 |
| Sulfuric acid, 10% | 2 |
| Sulfuric acid, 36% | 3 |
| Hydrochloric acid, 10% | 2 |
| Sulfurous acid, 6% | 2 |
| Hydrochloric acid, 10% | 2 |
| Sodium hydroxide solution, 5% | 2 |
| DI water | 0 |

Example 2

The Preparation of a Solid-Color Topcoat Material and Production of a Solid-Color Topcoat System First of all a pigment paste was prepared by mixing the following constituents:

20 parts by weight of the dispersion of copolymer (A) from preparation example 1, 25 parts by weight of a melamine-formaldehyde resin (CYMEL® 327, hexamethoxymethyl type, Dyno-Cytec), 0.5 part by weight of BYK® 301 (silicone additive from Byk Chemie), 1 part by weight of BYK® 028 (defoamer from Byk Chemie), 1.2 parts by weight of a devolatilizer (Deuterol® 201 E from Deuteron GmbH), 6.7 parts by weight of deionized water, and 7 parts by weight of a white pigment (titanium dioxide RH D2 from Huntsman Tioxide Europe).

The resulting mixture was dispersed in a bead mill for 30 minutes. In order to remove the inclusions of air formed in the course of milling, the pigment paste was left at rest for 12 hours. It was then admixed with 61.4 parts by weight of the dispersion of the surface-modified nanoparticles (B) from preparation example 2 and 10 parts by weight of ethyl acetoacetate (C), after which the mixture was homogenized.

The resulting solid-color topcoat material was applied pneumatically using a gravity-feed cup gun to test panels in a plurality of cross passes, in a wet film thickness such that curing of the solid-color topcoat films at 140° C. for 22 minutes gave solid-color topcoat systems with a film thickness of 40 µm.

The test panels used were steel panels made from bodywork steel and panels of chromatized aluminum which had been pretreated with commercially customary zinc phosphate solution. The steel panels were coated in succession with an electrocoat in a thickness of from 18 to 22 µm (cured at 175° C. for 15 minutes) and a conventional surfacer coat in a thickness of from 35 to 40 µm (cured at 160° C. for 20 minutes).

The resulting clearcoats were free from stress cracks and other surface defects. Moreover, they were extremely scratch resistant, which was underlined using the steel wool scratch tast (rating 1). The gloss according to DIN 67530 (200) was 72 units.

What is claimed is:

1. An aqueous dispersion, comprising (A) at least one swellable polymer and/or oligomer containing at least one functional group that is at least one of an anionic functional group, a potentially anionic functional group, and/or a nonionic hydrophilic functional group, (B) surface-modified, cationically stabilized, inorganic nanoparticles of at least one kind, wherein the nanoparticles are modified with at least one compound of the general formula I:

$$[(S-)_o\text{-}L\text{-}]_m M(R)_n (H)_p \quad (I)$$

in which the indices and variables have the following meanings:

S is a reactive functional group;
L is an at least divalent organic linking group;
H is a hydrolyzable monovalent group or a hydrolyzable atom;
M is a divalent to hexavalent main group or transition group metal;
R is a monovalent organic radical;
o is an integer from 1 to 5;
m+n+p is an integer from 2 to 6;
p is an integer from 1 to 6; and
m and n are zero or an integer from 1 to 5, (C) at least one compound selected from the group consisting of amphiphiles and organic compounds which are capable of forming chelate ligands, and (D) at least one crosslinking agent, wherein the aqueous dispersion has a pH of from 2 to 7 and the compound of the general formula I, (C), and (D) are each different.

2. The aqueous dispersion of claim 1, wherein the at least one polymer and/or oligomer (A) contains anionic and/or potentially anionic functional groups, has at a pH of from 2 to 7, and has an electrophoretic mobility $\leq -0.5$ (μm/s)/(V/cm).

3. The aqueous dispersion of claim 1, wherein the at least one polymer and/or oligomer (A) contains at least one reactive functional group (S) selected from the group consisting of (S1) reactive functional groups which contain at least one bond which can be activated with actinic radiation and/or (S2) reactive functional groups which are able to undergo reactions with groups of their own kind and/or with complementary reactive functional groups.

4. The aqueous dispersion of claim 3, wherein the reactive functional groups that are complementary to the reactive functional groups (S2) of the at least one polymer and/or oligomer (A) are present in the surface-modified nanoparticles (B), in the amphiphile, and/or in the at least one crosslinking agent (D).

5. The aqueous dispersion of claim 1, wherein the inorganic nanoparticles (B) are selected from the group consisting of main group and transition group metals and their compounds.

6. The aqueous dispersion of claim 5, wherein the main group and transition group metals are selected from the group consisting of metals of main group three, metals of main group four, metals of main group five, metals of transition group three, metals of transition group four, metals of transition group five, metals of transition group six, metals of group one, metals of group two, and the lanthanides.

7. The aqueous dispersion of claim 6, wherein the metals are selected from the group consisting of boron, aluminum, gallium, silicon, germanium, tin, arsenic, antimony, silver, zinc, titanium, zirconium, hafnium, vanadium, niobium, tantalum, molybdenum, tungsten, and cerium.

8. The aqueous dispersion of claim 1, wherein the at least one polymer and/or oligomer (A) contains at least one reactive functional group S selected from the group consisting of (S1) reactive functional groups which contain at least one bond which can be activated with actinic radiation and (S2) reactive functional groups which undergo reactions with groups of their own kind and/or with complementary reactive functional groups.

9. The aqueous dispersion of claim 8, wherein the reactive functional groups that are complementary to the reactive functional groups (S2) are present in the at least one polymer and/or oligomer (A), in the amphiphile, and/or in the at least one crosslinking agent (D).

10. The aqueous dispersion of claim 1, wherein the amphiphile is selected from the group consisting of monoalcohols and aliphatic polyols.

11. The aqueous dispersion of claim 10, wherein the monoalcohols are selected from the group consisting of monoalcohols having from 3 to 6 carbon atoms in the molecules and the aliphatic polyols are selected from the group consisting of diols having from 3 to 12 carbon atoms in the molecule.

12. The aqueous dispersion of claim 1, wherein the organic compounds which foam chelate ligands are selected from the group consisting of compounds containing at least two functional groups which are able to coordinate with metal atoms or metal ions.

13. The aqueous dispersion of claim 1, wherein the at least one crosslinking agent (D) contains at least one reactive functional group which is able to undergo reaction with at least one complementary reactive functional group (S2) present in the at least one polymer and/or oligomer (A), on the surface-modified nanoparticles (B), and/or in the amphiphile.

14. The aqueous dispersion of claim 13, wherein the at least one reactive functional group of the at least one crosslinking agents (D) is selected from the group consisting of N-methylol groups, N-methylol ether groups, and alkoxycarbonylamino groups.

15. The aqueous dispersion of claim 14, wherein the at least one crosslinking agent (D) is selected from the group consisting of amino resins and tris(alkoxycarbonylamino)triazines.

16. The aqueous dispersion of claim 15, wherein the amino resins comprise melamine-formaldehyde resins.

17. The aqueous dispersion of claim 2, wherein when complementary reactive functional groups are present in the at least one polymer and/or oligomer (A) and/or the amphiphile they are hydroxyl groups.

18. The aqueous dispersion of claim 1, further comprising at least one pigment (E).

19. The aqueous dispersion of claim 18, wherein the pigment (E) is selected from the group consisting of color pigments, optical effect pigments, electrically conductive pigments, magnetic pigments, magnetically shielding pigments, fluorescent pigments, phosphorescent pigments, corrosion inhibitor pigments, extender pigments, and pigments which have at least two of these properties.

20. A process for preparing the aqueous dispersion of claim 1, comprising dispersing (B) the surface-modified, cationically stabilized, inorganic nanoparticles of at least one kind, (C) the at least one compound selected from the group consisting of amphiphiles and organic compounds which are capable of forming chelate ligands, and (D) the at least one crosslinking agent, and (E) optionally at least one pigment in an aqueous dispersion of the at least one swellable polymer and/or oligomer, and homogenizing the resulting mixture.

21. A method comprising applying the aqueous dispersion of claim 1 to a substrate and forming one of a coating for a motor vehicle body or part, a coating for an interior and/or exterior of a building, a coating for a door, a coating for a windows, a coating for furniture, an industrial coating, a coating for plastics parts, a coating for a coil, a coating for a containers, a coating for an electrical component, a coating for white goods, or a coating for hollow glassware.

22. A method comprising applying the aqueous dispersion of claim 1 to a substrate as a molding or as a self-supporting films.

23. The aqueous dispersion of claim 3, wherein the crosslinking agent (D) comprises a complementary reactive function group.

* * * * *